United States Patent
Gunreben et al.

(10) Patent No.: US 10,563,447 B2
(45) Date of Patent: Feb. 18, 2020

(54) CONTROL SYSTEM

(71) Applicant: Brose Fahrzeugteile GmbH & Co. KG, Hallstadt, Hallstadt (DE)

(72) Inventors: Andre Gunreben, Hallstadt (DE); Henning Moench, Coburg (DE); Holger Wuerstlein, Zeil am Main (DE); Thorsten Kuhnen, Litzendorf (DE); James Troeger, Rochester Hills, MI (US)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/367,786

(22) PCT Filed: Dec. 18, 2012

(86) PCT No.: PCT/EP2012/005234
§ 371 (c)(1),
(2) Date: Jun. 20, 2014

(87) PCT Pub. No.: WO2013/091839
PCT Pub. Date: Jun. 27, 2013

(65) Prior Publication Data
US 2014/0373447 A1    Dec. 25, 2014

(30) Foreign Application Priority Data

Dec. 21, 2011 (DE) .......................... 10 2011 121 775

(51) Int. Cl.
*E05F 15/73* (2015.01)
*G01B 7/02* (2006.01)
(Continued)

(52) U.S. Cl.
CPC ............... *E05F 15/73* (2015.01); *B60J 5/101* (2013.01); *E05F 15/74* (2015.01); *G01B 7/023* (2013.01);
(Continued)

(58) Field of Classification Search
CPC ........... G01B 5/101; E05F 15/20; E05F 15/70
See application file for complete search history.

(56) References Cited

U.S. PATENT DOCUMENTS 2,127,359 A * 8/1938 Harley .................. B60D 1/065
280/475
5,351,519 A   10/1994 Kress et al.
(Continued)

FOREIGN PATENT DOCUMENTS

DE    4408468    9/1995
DE    10235925   2/2004
(Continued)

OTHER PUBLICATIONS

International Written Opinion for PCT/EP2012/005234 related to U.S. Appl. No. 14/367,786, completed Jun. 7, 2014 (10 pages).
(Continued)

Primary Examiner — Marcus Menezes
(74) Attorney, Agent, or Firm — Pauly, DeVries Smith & Deffner LLC

(57) ABSTRACT

A control system for driving a motorized closure element of a motor vehicle is provided, wherein, in order to detect operator control events, at least one sensor control means and at least one elongate distance sensor which extends along a sensor extent are provided, wherein the sensor control means drives the associated distance sensor, evaluates the sensor signals from the distance sensor or drives the associated distance sensor and evaluates the sensor signals from the distance sensor, and wherein the distance sensor
(Continued)

detects a distance from a user. The control system can be configured such that when it is installed in a vehicle, a vehicle component can be arranged in or along the sensor extent, and that the distance sensor is designed such that it has a blind section in the region of the vehicle component, the blind section having no sensitivity or a lower level of sensitivity compared to that region of the distance sensor which adjoins the blind section.

16 Claims, 2 Drawing Sheets

(51) Int. Cl.
  *E05F 15/74* (2015.01)
  *B60J 5/10* (2006.01)
  *E06B 9/68* (2006.01)
(52) U.S. Cl.
  CPC ..... *E05Y 2400/856* (2013.01); *E05Y 2400/86* (2013.01); *E06B 2009/6836* (2013.01)

(56) References Cited

U.S. PATENT DOCUMENTS

| | | | |
|---|---|---|---|
| 5,394,292 | A | 2/1995 | Hayashida |
| 5,844,486 | A | 12/1998 | Barron et al. |
| 5,959,456 | A | 9/1999 | Whorlow et al. |
| 6,275,146 | B1 | 8/2001 | Kithil et al. |
| 6,337,549 | B1 | 1/2002 | Bledin |
| 6,478,357 | B2 | 11/2002 | Zhou |
| 7,217,891 | B2 | 5/2007 | Fischer et al. |
| 7,688,013 | B2 | 3/2010 | Frommer et al. |
| 7,768,272 | B2 | 8/2010 | Kato et al. |
| 7,880,481 | B2 | 2/2011 | Zangl et al. |
| 8,027,769 | B2 | 9/2011 | Zander et al. |
| 8,225,458 | B1 | 7/2012 | Hoffberg et al. |
| 8,284,022 | B2 | 10/2012 | Kachouh |
| 8,606,467 | B2 | 12/2013 | Gehin |
| 8,692,565 | B2 | 4/2014 | Togura |
| 8,723,532 | B2 | 5/2014 | Asjes et al. |
| 8,788,152 | B2 | 7/2014 | Reimann et al. |
| 8,823,394 | B2 | 9/2014 | Reime |
| 8,966,825 | B2 | 3/2015 | Uebelein et al. |
| 8,970,232 | B2 | 3/2015 | Kandler |
| 9,081,032 | B2 | 7/2015 | Lange |
| 9,274,154 | B2 | 3/2016 | Togura |
| 9,283,994 | B2 | 3/2016 | Holzberg et al. |
| 9,290,982 | B2 | 3/2016 | Schuetz et al. |
| 9,304,156 | B2 | 4/2016 | Weingaertner et al. |
| 9,541,590 | B2 | 1/2017 | Geuther et al. |
| 9,543,674 | B2 | 1/2017 | Wuerstlein et al. |
| 9,574,388 | B2* | 2/2017 | Ebert ............... E05F 15/73 |
| 9,585,280 | B2 | 2/2017 | Wuerstlein et al. |
| 9,587,417 | B2* | 3/2017 | Van Gastel ......... E05B 81/78 |
| 9,689,982 | B2* | 6/2017 | Herthan ............. G01S 13/931 |
| 9,702,682 | B2 | 7/2017 | Kuhnen et al. |
| 9,731,627 | B2 | 8/2017 | Lamesch et al. |
| 9,845,629 | B2* | 12/2017 | Washeleski ......... E05F 15/40 |
| 9,939,956 | B2 | 4/2018 | Roziere et al. |
| 9,995,601 | B2 | 6/2018 | Wuerstlein et al. |
| 10,107,851 | B2 | 10/2018 | Reimann |
| 2002/0030666 | A1 | 3/2002 | Philipp et al. |
| 2002/0143452 | A1 | 10/2002 | Losey et al. |
| 2004/0085079 | A1 | 5/2004 | Lin et al. |
| 2004/0178924 | A1 | 9/2004 | Gifford et al. |
| 2005/0114276 | A1 | 5/2005 | Hunter et al. |
| 2005/0231194 | A1 | 10/2005 | Baldi et al. |
| 2006/0267374 | A1 | 11/2006 | Jackson et al. |
| 2006/0293800 | A1 | 12/2006 | Bauer et al. |
| 2007/0072154 | A1 | 3/2007 | Akatsuka et al. |
| 2007/0102220 | A1 | 5/2007 | Kiribayashi |
| 2007/0296242 | A1* | 12/2007 | Frommer ............ E05F 15/43 296/146.4 |
| 2008/0068145 | A1 | 3/2008 | Weghaus et al. |
| 2008/0088188 | A1 | 4/2008 | Busch et al. |
| 2008/0122454 | A1 | 5/2008 | Kato |
| 2008/0195273 | A1 | 8/2008 | Matsuura et al. |
| 2008/0211519 | A1 | 9/2008 | Kurumado et al. |
| 2008/0303685 | A1 | 12/2008 | Nakano et al. |
| 2009/0222174 | A1 | 9/2009 | Frommer et al. |
| 2009/0243826 | A1 | 10/2009 | Touge et al. |
| 2010/0079283 | A1 | 4/2010 | Hammerschmidt et al. |
| 2010/0256875 | A1 | 10/2010 | Gehin et al. |
| 2010/0259283 | A1 | 10/2010 | Togura |
| 2010/0289506 | A1 | 11/2010 | Moon et al. |
| 2011/0118946 | A1* | 5/2011 | Reimann ............ B60R 25/2036 701/49 |
| 2011/0133756 | A1 | 6/2011 | Reime |
| 2011/0234370 | A1 | 9/2011 | Briese et al. |
| 2011/0254572 | A1 | 10/2011 | Yamaguchi et al. |
| 2011/0276234 | A1* | 11/2011 | Van Gastel ............ E05B 81/78 701/49 |
| 2011/0313619 | A1 | 12/2011 | Washeleski et al. |
| 2012/0188078 | A1 | 7/2012 | Soles et al. |
| 2012/0290177 | A1 | 11/2012 | Wagenhuber et al. |
| 2013/0187664 | A1 | 7/2013 | Deumal Herraiz et al. |
| 2013/0193989 | A1 | 8/2013 | Kuhnen et al. |
| 2013/0207677 | A1 | 8/2013 | Togura |
| 2013/0234733 | A1 | 9/2013 | Lange et al. |
| 2013/0234828 | A1 | 9/2013 | Holzberg et al. |
| 2013/0311039 | A1* | 11/2013 | Washeleski ............ E05F 15/20 701/36 |
| 2013/0321006 | A1 | 12/2013 | Weingaertner et al. |
| 2014/0032055 | A1 | 1/2014 | Holzberg et al. |
| 2014/0195073 | A1* | 7/2014 | Herthan ............... B60R 25/2045 701/2 |
| 2014/0285217 | A1* | 9/2014 | Van Gastel ......... B60R 25/2054 324/658 |
| 2014/0324273 | A1 | 10/2014 | Russ et al. |
| 2014/0373447 | A1* | 12/2014 | Gunreben .......... G07C 9/00309 49/31 |
| 2015/0012176 | A1 | 1/2015 | Schindler et al. |
| 2015/0019085 | A1* | 1/2015 | Ma .................... E05F 15/2023 701/49 |
| 2015/0035549 | A1 | 2/2015 | Sugiura |
| 2015/0070033 | A1 | 3/2015 | Pohl et al. |
| 2015/0128497 | A1 | 5/2015 | Schuetz et al. |
| 2015/0134208 | A1* | 5/2015 | Gunreben ........... B60R 25/2054 701/49 |
| 2015/0176322 | A1* | 6/2015 | Wuerstlein ............ E05F 15/70 701/49 |
| 2015/0176323 | A1 | 6/2015 | Ebert |
| 2015/0176324 | A1* | 6/2015 | Ebert ..................... E05F 15/73 701/49 |
| 2015/0219703 | A1 | 8/2015 | Geuther et al. |
| 2015/0233167 | A1* | 8/2015 | Natsui ................. E05F 15/70 701/49 |
| 2015/0241195 | A1 | 8/2015 | Schenkewitz et al. |
| 2015/0258879 | A1* | 9/2015 | Mandzak ............... B60J 5/101 296/187.11 |
| 2015/0267454 | A1 | 9/2015 | Wuerstlein et al. |
| 2015/0330767 | A1 | 11/2015 | Pohl et al. |
| 2015/0345205 | A1* | 12/2015 | Gunreben ............ E05F 15/77 701/2 |
| 2016/0043486 | A1 | 2/2016 | Wuerstlein et al. |
| 2016/0057882 | A1 | 2/2016 | Wuerstlein et al. |
| 2016/0245671 | A1 | 8/2016 | Wuerstlein et al. |
| 2016/0265263 | A1* | 9/2016 | Motoki ................ E05F 15/73 |
| 2017/0138997 | A1 | 5/2017 | Wuerstlein et al. |
| 2017/0190309 | A1* | 7/2017 | Herthan ............... B60R 19/483 |
| 2017/0235413 | A1 | 8/2017 | Koizumi |
| 2017/0241187 | A1* | 8/2017 | Takayanagi ......... E05F 15/75 |

FOREIGN PATENT DOCUMENTS

| | | |
|---|---|---|
| DE | 10254708 | 6/2004 |
| DE | 102004055982 | 6/2006 |
| DE | 102004057220 | 6/2006 |
| DE | 102005042402 | 3/2007 |
| DE | 102005055002 | 5/2007 |
| DE | 10158533 | 2/2009 |

(56) References Cited

FOREIGN PATENT DOCUMENTS

| | | | | |
|---|---|---|---|---|
| DE | 102009004384 | 7/2009 | | |
| DE | 102008041354 | 2/2010 | | |
| DE | 102009041555 | 6/2010 | | |
| DE | 102009047066 | 5/2011 | | |
| DE | 102009055778 | 6/2011 | | |
| DE | 102010048144 | 7/2011 | | |
| DE | 102010006213 | 8/2011 | | |
| DE | 102010002559 | 9/2011 | | |
| DE | 102010037577 A1 * | 3/2012 | ......... | B60R 25/2054 |
| DE | 102011112274 | 3/2013 | | |
| DE | 102012104915 A1 * | 12/2013 | ........... | H03K 17/955 |
| DE | 102012013065 | 1/2014 | | |
| DE | 102013112418 | 5/2015 | | |
| DE | 102013114881 | 6/2015 | | |
| EP | 0711977 | 5/1996 | | |
| EP | 1422366 | 5/2004 | | |
| FR | 2740501 A1 * | 4/1997 | ......... | B60R 25/2009 |
| FR | 2943190 | 9/2010 | | |
| GB | 2376075 | 12/2002 | | |
| JP | 02055168 | 2/1990 | | |
| JP | 6018547 | 1/1994 | | |
| JP | 2007228640 | 9/2007 | | |
| JP | 2009079353 | 4/2009 | | |
| JP | 2010236184 | 10/2010 | | |
| WO | 2005084979 | 9/2005 | | |
| WO | 2007/006514 | 1/2007 | | |
| WO | WO-2007006514 A1 * | 1/2007 | ........... | B60Q 1/0023 |
| WO | 2010060767 | 6/2010 | | |
| WO | 2010076332 | 7/2010 | | |
| WO | 2011092206 | 8/2011 | | |
| WO | 2012052210 | 4/2012 | | |
| WO | 2012/084111 | 6/2012 | | |
| WO | 2013000805 | 1/2013 | | |
| WO | 2013034252 | 3/2013 | | |
| WO | 2013091839 | 6/2013 | | |

OTHER PUBLICATIONS

Brose Fahrzeugteile Gmbh & CO.KG, "Sesam oeffne Dich. In: AutomobilKONSTRUKTION," Feb. 2012 (pp. 50-51), with English translation (4 pages).

European Search Report for EP Application No. 13713812.2 corresponding to U.S. Appl. No. 13/951,163 dated Oct. 31, 2013 (3 pages).

German Search Report for German Patent Application No. 102013114883.2, dated Feb. 4, 2014 (5 pages).

German Search Report for DE Application No. 102011112274.9 corresponding to U.S. Appl. No. 14/343,005, dated May 9, 2012 (4 pages).

International Search Report and Written Opinion for PCT/EP2013/063905 related to U.S. Appl. No. 14/412,511, dated Aug. 1, 2013 (8 pages) [English Translation].

International Search Report for application No. PCT/EP2013/066998 corresponding to U.S. Appl. No. 14/343,005, dated Oct. 26, 2012 (6 pages).

International Search Report for PCT/EP2012/005234 related to U.S. Appl. No. 14/367,786, dated Jun. 14, 2013 (3 pages).

Non Final Office Action Citation for U.S. Appl. No. 14/367,786 dated Feb. 1, 2016 (15 pages).

Non Final Office Action for U.S. Appl. No. 14/343,005, dated Feb. 11, 2016 (23 pages).

Non Final Office Action for U.S. Appl. No. 13/951,163, dated Dec. 17, 2014 (31 pages).

Non-Final Office Action for U.S. Appl. No. 14/412,511, dated Apr. 11, 2016 (20 pages).

Non-Final Office Action for U.S. Appl. No. 14/581,441, dated Jun. 3, 2016 (10 pages).

Notice of Allowance for U.S. Appl. No. 13/951,163, dated Nov. 6, 2015 (13 pages).

Office Action for KR Patent Application No. 10-2013-0087175 corresponding to U.S. Appl. No. 13/951,163 completed Jan. 21, 2015 (13 pages).

Search Report for German Application No. 102012014676.0 corresponding to U.S. Appl. No. 13/951,163, dated Jan. 18, 2013 (5 pages).

Search Report for German Patent Application No. 102012013065.1 related to U.S. Appl. No. 14/412,511, dated Jun. 28, 2013 (5 pages).

Non-Final Office Action for U.S. Appl. No. 15/351,913 dated Nov. 30, 2018 (30 pages).

Notice of Allowance for U.S. Appl. No. 15/351,913 dated May 10, 2019 (25 pages).

Opposition Proceedings mailed on Mar. 29, 2019, for EP16195945.7 (related to U.S. Appl. No. 15/351,913), 5 pages.

Response to Non-Final Rejection dated Nov. 30, 2018, for U.S. Appl. No. 15/351,913, submitted via EFS-WEB on Feb. 28, 2019, 9 pages.

* cited by examiner

CONTROL SYSTEM

CROSS-REFERENCE TO RELATED APPLICATIONS

This application is a national stage application under 35 U.S.C. 371 of International Patent Application Serial No. PCT/EP2012/005234, entitled "Steuersystem," filed Dec. 18, 2012, which claims priority from German Patent Application No. DE 10 2011 121 775.8, filed Dec. 21, 2011, the disclosures of which are incorporated herein by reference.

FIELD OF THE INVENTION

The invention relates to a control system for driving a motorized closure element of a motor vehicle and also to a method for operating a control system of this kind.

BACKGROUND

Modern motor vehicles are increasingly being equipped with motor-operated closure elements. Said closure elements may be, for example, doors such as side and rear doors, in particular sliding doors, hatches, in particular tailgates, trunk lids, engine hoods, cargo space floors or the like, of a motor vehicle. In this respect, the term "closure element" has a broad meaning in the present case.

One convenience function which is becoming increasingly important today is the automatic operation of the motorized tailgate of a motor vehicle. In the case of the known control system (DE 20 2005 020 140 U1) on which the invention is based, provision is made for an operator control event which is performed by the operator, in this case a foot movement which is performed by the operator, to prompt motorized opening of the tailgate.

A drive arrangement which is associated with the tailgate, a sensor control means and also a distance sensor are provided for this purpose. The sensor control means monitors the sensor signals in order to check whether the above-mentioned operator control event is occurring. The drive arrangement is accordingly driven depending on the result of this operator control event monitoring operation.

Capacitive distance sensors which are equipped with at least one measurement electrode can be used in order to detect the abovementioned operator control events. In this case, an operator control event triggers a change in capacitance of the electrode arrangement, it being possible for this change in capacitance to be easily detected in an electronic manner. A measurement electrode of this kind is generally integrated into the rear skirt of a motor vehicle and extends over the entire width of the motor vehicle.

Difficulties can arise when vehicle components, in particular add-on parts, interfere with detection of the operator control events by sensor or are simply in the way of the measurement electrode. Vehicle components of this kind may be trailer couplings, bicycle mounts, exhaust gas systems or the like.

SUMMARY

The invention is based on the problem of designing and developing the known control system in such a way that any possible interference in the detection of operator control events by sensor by specific vehicle components is prevented.

According to the proposal, it has been identified that the at least one distance sensor of the control system can be structurally designed such that its sensor operation is not adversely affected or is only slightly adversely affected by the interfering vehicle component.

Specifically, the distance sensor has a blind section in the region of the vehicle component, said blind section having no sensitivity or a lower level of sensitivity compared to that region of the distance sensor which adjoins the blind section.

In this case, the term "sensitivity" is to be understood in the broadest sense in such a way that a change in the sensitivity given the same distance from the user always results in a corresponding change in the sensor signal. The formulation "no sensitivity" means, in the above sense, that no detection by sensor at all takes place in the blind section.

The term "blind section" is likewise to be understood in the broadest sense. As indicated above, said term covers not only a section which has absolutely no sensitivity, that is to say there is no detection by sensor, but also a section with a comparatively low level of sensitivity.

The proposed solution ensures a high degree of robustness in respect of any possible interference with the sensor by the vehicle component in question and can be realized in an extremely simple manner.

The distance sensor is equipped with a blind section which is associated with the vehicle component, said blind section being designed such that the vehicle component cannot be detected by the distance sensor and accordingly does not cause any interference in the detection of the distance from a user by sensor.

In an embodiment, the blind section has a shield which shields the region of the vehicle component in respect of detection by sensor. A shield of this type can, in principle, cause the above reduction in sensitivity.

In an embodiment which can be easily realized from a structural point of view, the blind section is an interruption in the distance sensor along the sensor extent, with the result that a sensor module is arranged on either side of the vehicle component. This interruption in the distance sensor is particularly advantageous in as much as the vehicle component can be readily accommodated within the blind section without causing structural overlapping between the vehicle component and the distance sensor.

According an embodiment, a motor vehicle comprising a motorized closure element, such as comprising a motorized tailgate, a motorized side door, a motorized sliding door or the like, said motor vehicle being equipped with a control system as proposed above. Reference may be made to all embodiments which are suitable for describing the proposed motor vehicle.

According to an embodiment, a method for operating a proposed control system is disclosed.

According to this further teaching, it is essential for a longitudinal movement by the user along the sensor extent of the at least one distance sensor through the blind section of said distance sensor to produce a pattern in the profile of the sensor signal with respect to time, which pattern is detected by the control system at least as part of an operator control event. Specifically, it is then possible to detect not only a distance from a user, but rather a movement direction by the user along the sensor extent. In this respect, reference may be made to all of the statements made in relation to the proposed control system.

In an embodiment, the invention includes a control system for driving a motorized closure element of a motor vehicle, wherein, in order to detect operator control events, at least one sensor control means and at least one elongate distance sensor which extends along a sensor extent are provided, wherein the sensor control means drives the associated distance sensor and/or evaluates the sensor signals from said distance sensor, and wherein the distance sensor detects a distance from a user, wherein, with the control system installed, a vehicle component is arranged or can be arranged in or along the sensor extent, and in that the distance sensor is designed such that it has a blind section in the region of the vehicle component, said blind section having no sensitivity or a lower level of sensitivity compared to that region of the distance sensor which adjoins the blind section and in that, owing to the blind section the vehicle component cannot be detected by the distance sensor and does not cause any interference in the detection of the distance from a user by sensor.

In an embodiment, at least two elongate distance sensors are provided, said distance sensors extending substantially parallel in relation to one another.

In an embodiment, the at least one distance sensor is designed as a capacitive sensor with an elongate measurement electrode.

In an embodiment, the extent of the blind section along the sensor extent is at least 5% of the total length of the distance sensor.

In an embodiment, the blind section has a shield which shields the region of the vehicle component in respect of detection by sensor.

In an embodiment, the blind section is an interruption in the distance sensor along the sensor extent, with the result that a sensor module is arranged on either side of the vehicle component.

In an embodiment, the sensor modules of a distance sensor which are arranged on either side of the vehicle component make electrical contact with one another.

In an embodiment, a separate sensor control means is associated with each of the sensor modules of a distance sensor which are arranged on either side of the vehicle component, or in that a common sensor control means is associated with the sensor modules of a distance sensor which are arranged on either side of the vehicle component.

In an embodiment, a common sensor control means is associated with the sensor modules of the at least two distance sensors, which sensor modules are arranged on one side of the vehicle component.

In an embodiment, the distance sensor is arranged in or on a vehicle body part.

In an embodiment, a motor vehicle comprises a motorized closure element, in particular comprising a motorized tailgate, a motorized side door, a motorized sliding door or the like, and comprising a control system for driving the motorized closure element as disclosed herein.

In an embodiment the invention provides a method for operating a control system as disclosed herein, wherein a longitudinal movement by the user along the sensor extent of the at least one distance sensor through the blind section of said distance sensor produces a pattern in the profile of the sensor signal with respect to time, which pattern is detected by the control system at least as part of an operator control event.

In an embodiment, the vehicle component comprises a trailer coupling or the like.

In an embodiment, the extent of the blind section along the sensor extent is at least 10% of the total length of the distance sensor.

In an embodiment, the vehicle body part comprises a front, rear or side skirt.

In an embodiment, the distance sensor extends at least over the substantial width of the vehicle body part.

BRIEF DESCRIPTION OF THE FIGURES

The invention will be explained in greater detail below with reference to a drawing which illustrates only one exemplary embodiment and in which.

DETAILED DESCRIPTION

The proposed control system will be explained below with reference to a motorized closure element 1 of a motor vehicle, which closure element is designed as a tailgate.

The design of the closure element 1 can include a tailgate of a motor vehicle. However, reference may be made to the introductory part of the description in respect of the broad meaning of the term "closure element". In this respect, all of the statements made in relation to a tailgate 1 correspondingly apply for all other types of closure elements.

Figure 1:
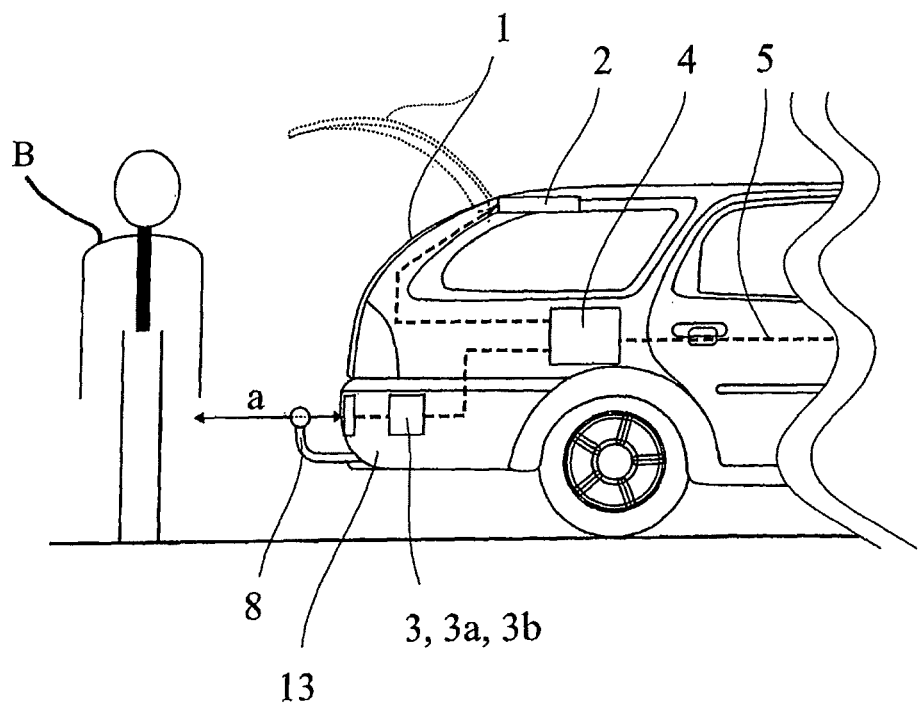
FIG. 1 shows the rear region of a motor vehicle comprising a proposed control system for carrying out the proposed method.

The tailgate 1 has an associated drive arrangement 2 by means of which the tailgate 1 can be adjusted in a motorized manner between the closed position, which is illustrated using solid lines in FIG. 1, and the open position, which is illustrated using dashed lines in FIG. 1.

A sensor control means 3 which serves to detect operator control events and, on the basis of these, driving of the motorized tailgate 1, is also provided. In an embodiment, the at least one sensor control means 3 has an associated superordinate tailgate control device 4 which communicates with a central vehicle control means or the like via a bus system 5. The actual extraction of operator control events from the sensor signals, in particular a corresponding pattern identification, can be performed in the tailgate control device 4. However, it is also feasible for this to be performed at least partially, in particular for the purpose of signal pre-processing, in the at least one sensor control means 3.

The sensor signals which are to be evaluated can be traced back to at least one elongate distance sensor 6, 7, in this case to precisely two elongate distance sensors 6, 7 which run parallel in relation to one another and each extend along a sensor extent. The sensor extent can be straight, bent, circular or the like.

Precisely two distance sensors 6, 7 are provided, said distance sensors extending, as indicated above, substantially parallel in relation to one another. In principle, it is also feasible for more than two elongate distance sensors 6, 7 to be provided. In the present case, only one single distance sensor 6, 7 is described at certain points, the intention being to simplify said description. All of the statements made in this respect correspondingly apply for the respectively second distance sensor 6, 7.

As indicated above, the task of the at least one sensor control means 3 is to drive the associated distance sensor 6, 7 and/or to evaluate the sensor signals from said distance sensor. The at least one distance sensor 6, 7 is designed such that a distance a from a user B can be detected using said distance sensor.

Figure 2:
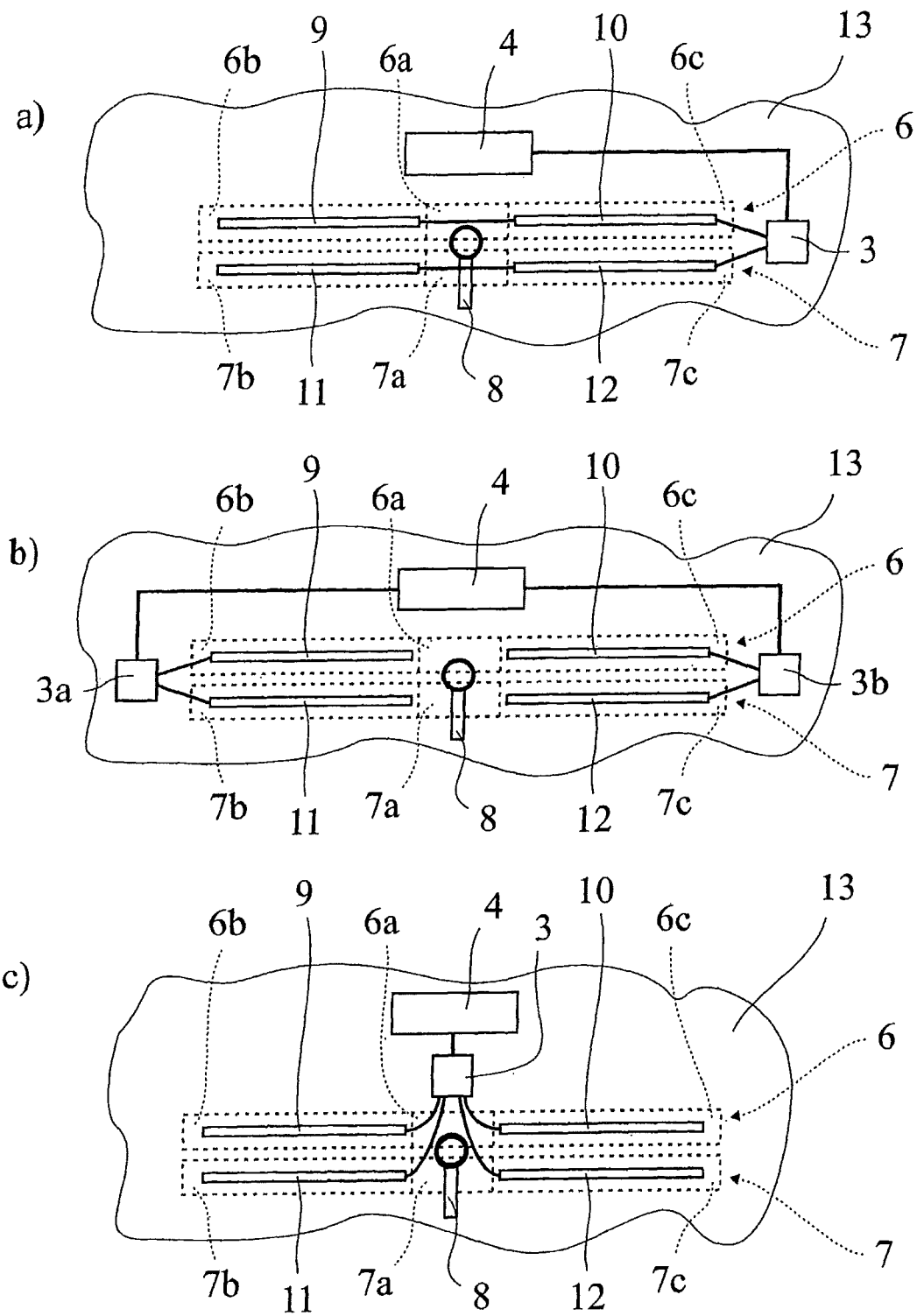
FIG. 2 is a highly schematic illustration of the rear skirt of the rear region according to FIG. 1 in a view from the end a) comprising a first proposed control system, b) comprising a second proposed control system, and c) comprising a third proposed control system.

Looking at FIGS. 1 and 2 together shows that, with the control system installed, a vehicle component 8, in this case a trailer coupling 8, is arranged or can be arranged in the sensor extent. The expression "can be arranged" is intended to mean that the vehicle component 8, in this case the trailer coupling, can generally be removed. Other vehicle components are feasible in this connection. Examples of said other vehicle components include bicycle mounts, exhaust gas systems or the like.

FIG. 2 suggests that, given a specific design of the at least one distance sensor 6, 7, it would be possible to detect the vehicle component 8 using the distance sensor 6, 7, and this would interfere with the detection of the distance a to a user B by sensor. This would be the case, in particular, if the distance sensor 6, 7 were to extend in a homogeneous manner over the entire vehicle width.

However, in an embodiment, the at least one distance sensor 6, 7 is designed such that it has a blind section 6a, 7a in the region of the vehicle component 8, said blind section having no sensitivity. This is realized by an interruption in the distance sensor 6, 7 in the region of the vehicle component 8, as will be explained below. However, in principle, it is also feasible for the blind section 6a, 7a to have a lower level of sensitivity compared to that region of the distance sensor 6, 7 which adjoins the blind section 6a, 7a, as will likewise be explained below. Therefore, the interfering influence of the vehicle component 8 on the operation of the sensor is reduced in each case.

In an embodiment, the at least one distance sensor 6, 7 is designed such that it has a blind section 6a, 7a which is associated with the vehicle component 8 and, as a result, the vehicle component 8 cannot be detected by the distance sensor 6, 7. Accordingly, the vehicle component 8 cannot cause any interference in the detection of the distance a to a user B by sensor either. The blind section 6a, 7a ensures that the interfering influence of the vehicle component 8 on the respective measurement result is suppressed to a certain extent. In the present case, the expressions "cannot be detected" and "no interference" are not intended to be understood in an ideal sense in respect of the relatively harsh measurement conditions, but rather such that, in this variant, the vehicle component 8 does not have any appreciable effect on the operation of the sensor through the blind section.

The illustrated design of the distance sensor 6, 7 as a capacitive sensor has proven suitable in practice. However, it is advantageously also possible to use an inductive sensor. Other sensor principles can also be used in principle. It is feasible, for example, for the distance sensor 6, 7 to be a magnetic sensor.

The capacitive distance sensor 6, 7 has an associated elongate measurement electrode 9, 10; 11, 12 which extends along the respective sensor extent.

FIG. 2 shows that the blind section 6a, 7a can be designed as an interruption in the distance sensor 6, 7. Very generally, the extent of the blind section 6a, 7a along the sensor extent is at least 5%, and in particular at least 10%, of the total length of the distance sensor 6, 7. In principle, a far greater extent of the blind section 6a, 7a is feasible, for example when the vehicle component 8 in question is a bicycle mount or the like. The design, in particular the extent, of the blind section 6a, 7a is, as indicated further above, such that the influence of the vehicle component 8 in question on the measurement result is no longer significant.

In a design which is simple to realize, the blind section 6a, 7a has a shield which shields the region of the vehicle component 8 in respect of detection by sensor. The shield can be provided, for example, by a kind of metal screen, a metal casing or the like.

However, in an embodiment, the blind section 6a, 7a is an abovementioned interruption in the distance sensor 6, 7 along the sensor extent, with the result that a sensor module 6b, 6c; 7b, 7c is arranged on either side of the vehicle component 8. The sensor modules 6b, 6c, 7b, 7c each have an associated measurement electrode 9, 10, 11, 12, as can be seen in the illustration according to FIG. 2.

Driving of the sensor modules 6b, 6c, 7b, 7c is highly significant in the present case.

In a particularly simple variant, the sensor modules 6b, 6c; 7b, 7c of a distance sensor 6, 7 which are arranged on either side of the vehicle component 8 make electrical contact with one another. This means that the measurement electrodes 9, 10 and the measurement electrodes 11, 12 make electrical contact with one another, as can be seen in the illustration according to FIG. 2a). In this case, a common sensor control means 3 is associated with the two distance sensors 6, 7, said common sensor control means allowing the two distance sensors 6, 7 to be driven in parallel or allowing the two distance sensors 6, 7 to be driven alternately.

However, it is also feasible for a separate sensor control means 3 to be associated with each of the sensor modules 6b, 6c; 7b, 7c of a distance sensor 6, 7 which are arranged on either side of the vehicle component 8. By way of example, a dedicated sensor control means 3 can be associated with each measurement electrode 9, 10, 11, 12. However, it is also feasible for a common sensor control means 3 to be associated with the sensor modules 6b, 6c; 7b, 7c of a distance sensor 6, 7 which are arranged on either side of the vehicle component 8.

In the design which is illustrated in FIG. 2b), a common sensor control means 3a, 3b is associated with the sensor modules 6b, 7b; 6c, 7c of the at least two distance sensors 6, 7, which sensor modules are arranged on one side of the vehicle component 8.

Finally, it is feasible for all of the measurement electrodes 9, 10, 11, 12 of the distance sensors 6, 7 to be connected to a sensor control means 3 separately. This is illustrated in FIG. 2c).

Depending on the structure of the control means, the measurement electrodes 9, 10, 11, 12 can be electrically connected at least partially via plug connections, before connection to the sensor control means 3. As illustrated in the drawing, it is also feasible for each measurement electrode 9, 10, 11, 12 to be connected to the respective sensor control means 3 individually.

Since the distance sensors 6, 7 are not homogeneous along their sensor extent, but rather had been provided with the blind section 6a, 7a, a longitudinal movement by the user along the sensor extent has an effect on the measurement results. This can be utilized when detecting the operator control events, as will be explained below.

The illustrated motor vehicle is equipped with a vehicle body part 13 which may be, for example, a front/rear or side skirt. In the mounted state, the distance sensors 6, 7 are arranged in or behind the vehicle body part 13. In the vehicle body part 13 which is illustrated here and is designed as a rear skirt, the distance sensor 6, 7 can extend at least over the substantial width of the vehicle body part 13.

As explained above, the proposed solution can be used in all types of closure elements 1. The proposed solution can also be used to detect all types of user movements.

According to a further teaching, which has independent significance, a motor vehicle comprising a motorized closure element 1, in particular comprising a motorized tailgate, a motorized side door, a motorized sliding door or the like, is claimed, said motor vehicle being equipped with a proposed control system for driving the motorized closure element 1. Reference may be made to all of the statements made in relation to the proposed control system.

According to a further teaching which likewise has independent significance, a method for operating the proposed control system is claimed. The significant feature in the method is that a longitudinal movement by the user along the sensor extent of the at least one distance sensor 6, 7 through the blind section 6a, 7a of said distance sensor produces a pattern in the profile of the sensor signal with respect to time, said pattern being detected by the control system at least as part of an operator control event.

In an embodiment, which can best be realized with the design according to FIG. 2a), a longitudinal movement by the user leads to a sudden change in signal as soon as the user passes the vehicle component 8. This sudden change has a certain characteristic which is taken into account as part of the detection of operator control events.

In some embodiment according to FIGS. 2b) and *c*) even allow a movement direction in the longitudinal movement by the user to be identified since at least some of the respective measurement electrodes 9, 10, 11, 12 are driven separately. The movement direction in the longitudinal movement by the user can likewise be advantageously used when detecting operator control events.

The invention claimed is:

1. A control system for driving a motorized closure element of a motor vehicle, the control system comprising:
   at least one sensor control element; and
   at least one elongate distance sensor that detects a distance from a user, the at least one elongate distance sensor comprising a longitudinal sensor extent, a blind section, and an adjoining region that adjoins the blind section, wherein the at least one elongate distance sensor comprises at least one conductor that extends through the blind section;
   wherein the distance sensor extends along the longitudinal sensor extent;
   wherein the blind section and the adjoining region extend along the longitudinal sensor extent;
   wherein the blind section has a level of sensitivity that is lower than a level of sensitivity of the adjoining region;
   wherein the at least one sensor control element drives the distance sensor, evaluates sensor signals from the distance sensor, or drives the distance sensor and evaluates the sensor signals from the distance sensor;
   wherein the control system is configured such that when the control system is installed in a vehicle, the control system detects operator control events in the form of user movements and upon detection of an operator control event prompts motorized opening of the closure element;
   wherein the control system is configured such that when the control system is installed in a vehicle, the blind section is located in a vehicle component region; and
   wherein the level of sensitivity of the blind section is such that a vehicle component located in the vehicle component region cannot be detected by the distance sensor and does not cause any interference in the detection of the distance from the user by the distance sensor, wherein the blind section has no sensitivity such that no detection by the distance sensor takes placed in the blind section.

2. The control system as claimed in claim 1, comprising at least two elongate distance sensors, the at least two distance sensors extending substantially parallel in relation to one another.

3. The control system as claimed in claim 2, wherein each of the at least two distance sensors comprises multiple sensor modules, wherein the at least one sensor control element comprises a common sensor control element associated with a group of the sensor modules of the at least two distance sensors arranged on one side of the vehicle component.

4. The control system as claimed in claim 1, wherein the at least one distance sensor comprises a capacitive sensor with an elongate measurement electrode.

5. The control system as claimed in claim 1, wherein the extent of the blind section along the sensor extent is at least 5% of the total length of the distance sensor.

6. The control system as claimed in claim 1, wherein the at least one distance sensor comprises multiple sensor modules, including a first sensor module and a second sensor module, extending along the longitudinal sensor extent, wherein the blind section provides a break in the multiple sensor modules along the sensor extent such that the first and second sensor modules are arranged on opposite sides of the vehicle component.

7. The control system as claimed in claim 6, wherein the first and second sensor modules make electrical contact with one another.

8. The control system as claimed in claim 6, wherein the at least one sensor control element comprises a separate sensor control element associated with each of the first and second sensor modules.

9. The control system as claimed in claim 6, wherein the at least one sensor control element comprises a common sensor control element associated with both the first and second sensor modules.

10. The control system as claimed in claim 1, wherein the distance sensor is arranged in or on a vehicle body part.

11. The control system as claimed in claim 10, wherein the vehicle body part comprises a front, rear or side skirt.

12. The control system as claimed in claim 10, wherein the distance sensor extends over the width of the vehicle body part.

13. A motor vehicle comprising a motorized closure element, and comprising the control system for driving the motorized closure element as claimed in claim 1.

14. A method for operating the control system as claimed in claim 1, wherein a longitudinal movement by the user along the sensor extent of the at least one distance sensor through the blind section of said distance sensor produces a pattern in the profile of the sensor signal with respect to time, wherein the pattern is detected by the control system at least as part of an operator control event.

15. The control system as claimed in claim 1, wherein the vehicle component comprises a trailer coupling.

16. The control system as claimed in claim 1, wherein the extent of the blind section along the sensor extent is at least 10% of the total length of the distance sensor.

* * * * *